(12) United States Patent
Madineni et al.

(10) Patent No.: US 12,322,168 B2
(45) Date of Patent: Jun. 3, 2025

(54) FLAT FINE-GRAINED IMAGE CLASSIFICATION WITH PROGRESSIVE PRECISION

(71) Applicant: TELEDYNE FLIR COMMERICAL SYSTEMS, INC., Goleta, CA (US)

(72) Inventors: Kedar Babu Madineni, Goleta, CA (US); Louis Tremblay, Goleta, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 718 days.

(21) Appl. No.: 17/584,330

(22) Filed: Jan. 25, 2022

(65) Prior Publication Data

US 2023/0237786 A1    Jul. 27, 2023

(51) Int. Cl.
*G06K 9/00* (2022.01)
*G06N 3/048* (2023.01)
*G06N 3/08* (2023.01)
*G06V 10/764* (2022.01)
*G06V 10/776* (2022.01)
*G06V 10/82* (2022.01)

(52) U.S. Cl.
CPC ............. *G06V 10/82* (2022.01); *G06N 3/048* (2023.01); *G06N 3/08* (2013.01); *G06V 10/764* (2022.01); *G06V 10/776* (2022.01)

(58) Field of Classification Search
None
See application file for complete search history.

(56) References Cited

U.S. PATENT DOCUMENTS

| 9,928,448 | B1 * | 3/2018 | Merler | G06V 20/35 |
| 2020/0202168 | A1 * | 6/2020 | Mao | G06V 10/809 |
| 2021/0012194 | A1 * | 1/2021 | Laskaridis | G06N 3/063 |

OTHER PUBLICATIONS

Jiao et al., "Weakly labeled fine-grained classification with hierarchy relationship of fine and coarse labels" (Year: 2019).*

(Continued)

*Primary Examiner* — SJ Park
(74) *Attorney, Agent, or Firm* — Haynes and Boone, LLP (57) ABSTRACT

Progressive precision image classifier and method of training include storing a dataset of labeled images, training a neural network to generate a classification vector comprising a plurality of confidence values, each confidence value corresponding to a classification, validating the trained neural network, calculating fine-grained confidence thresholds for each classification, wherein each classification represents a leaf-level classification in a hierarchical classification structure, and calculating coarse-level confidence thresholds for at least one parent class in the hierarchical classification structure, wherein each parent class defines a group of at least one leaf-level classification. Each label in the training data identifies a leaf-level classification in the hierarchical classification structure, and the classification vector includes a 1×N vector of confidence values, where N represents a number of leaf-level classifications output by the trained neural network. The neural network may be implemented as a convolution neural network with a single output head.

20 Claims, 6 Drawing Sheets

(56) References Cited

OTHER PUBLICATIONS

Finn et al., "Model-Agnostic Meta-Learning for Fast Adaptation of Deep Networks", Proceedings of the 34th International Conference on Machine Learning, Jul. 18, 2017, 13 pages, Sydney, Australia.
Snell et al., "Prototypical Networks for Few-shot Learning", Jun. 19, 2017, 13 pages, arXiv, Canada.
Bertinetto et al., "Making Better Mistakes: Leveraging Class Hierarchies with Deep Networks", The IEEE/CVF Conference on Computer Vision and Pattern Recognition (CVPR), Jun. 12, 2020, 13 pages, arXiv, United States of America.
Chen et al., "Understanding the Impact of Label Granularity on CNN-based Image Classification", 2018 IEEE International Conference on Data Mining Workshops (ICDMW), Nov. 2018, pp. 895-904, Carnegie Mellon University, Pittsburgh, United States of America.
Oh, Sechan, "Top-k Hierarchical Classification", Proceedings of the AAAI Conference on Artificial Intelligence, Feb. 2017, pp. 2450-2455, vol. 31, No. 1, Association for the Advancement of Artificial Intelligence, Palo Alto, United States of America.
Deng et al., "Hedging Your Bets: Optimizing Accuracy-Specificity Trade-offs in Large Scale Visual Recognition", 2012 IEEE Conference on Computer Vision and Pattern Recognition, 2012, pp. 3450-3457, IEEE, United States of America.
Hoyoux et al., "Can computer vision problems benefit from structured hierarchical classification?", Machine Vision and Applications, 2016, pp. 1299-1312, vol. 27, No. 8, Belgium.
Wu et al., "Solving Long-tailed Recognition with Deep Realistic Taxonomic Classifier", Jul. 20, 2020, 18 pages, Springer-Verlag, San Diego, California, United States of America.

\* cited by examiner

| Labels | Input A (Top 1) | Input B (Top 2) | Input C (Top 8) |
|---|---|---|---|
| N/A | 0 | 0 | 0 |
| N/A | 0 | 0 | 0 |
| Background | *0.8424* | 0.2378 | 0.2313 |
| V1_MakeA | 0.2235 | 0.2326 | 0.2368 |
| V1_MakeB | 0.2197 | 0.2408 | *0.2478* (Correct label) |
| V1_MakeC | 0.2092 | 0.2348 | 0.2479 |
| V2 | 0.1995 | 0.2233 | 0.2504 |
| V3_MakeD_ModelA | 0.2085 | 0.2408 | *0.2923* |
| V3_MakeE_ModelB | 0.2146 | 0.2511 | 0.2671 |
| V3_MakeF_ModelC | 0.2147 | 0.2512 | 0.254 |
| V3_MakeG_ModelD | 0.2241 | 0.2234 | 0.2334 |
| N/A | 0 | 0 | 0 |
| N/A | 0 | 0 | 0 |
| N/A | 0 | 0 | 0 |
| V3_MakeD_ModelE | 0.2126 | 0.2406 | 0.2561 |
| V3_MakeG_ModelF | 0.2137 | 0.204 | *0.2831* |
| NA | 0 | 0 | 0 |
| V3_MakeG_ModelG | 0.218 | 0.2324 | 0.2537 |
| V3_MakeE_ModelH | 0.2163 | *0.4352* | 0.2535 |
| V4 | 0.2102 | 0.2297 | 0.2305 |
| Technical | 0.215 | *0.4964* | *0.3986* |

FLAT FINE-GRAINED IMAGE CLASSIFICATION WITH PROGRESSIVE PRECISION

TECHNICAL FIELD

Embodiments of the present disclosure relate generally to data classification systems and methods and, more particularly for example, to systems and methods for training and implementing a neural network for hierarchical multiclass image classification.

BACKGROUND

In the field of image processing, there is an ongoing need for efficient and reliable methods to detect and classify objects of interest within an image (e.g., an image representing a field of view of an image capture device, such as a camera). In one approach, various images of an object of interest are collected into a training dataset for training a neural network to classify the object. The training images may be generated with a camera capturing images of the object at various angles and in various settings, synthetically generated, or acquired through other methods. A training dataset can include thousands of images, each labeled for object classification.

A trained image classifier operates to match an input image with known classes and assign a classification generates the highest confidence. In some cases, the resulting classification may be associated with a low confidence level. In systems with a hierarchical classification structure, however, it may be desirable determine a parent classification when the child classification cannot be determined with confidence. For example, a classifier may be trained to identify the vehicle type, make, model, and year of a vehicle. If the classifier cannot determine the detailed model and year displayed in an image, it may still be desirable to output a parent or root class such as the make (e.g., vehicle manufacturer) and/or vehicle type (e.g., sedan, pickup truck, etc.). However, conventional systems do not provide a viable approach to addressing graceful degradation of predictions to a known hierarchy with a high level of certainly desired for practical applications.

In view of the foregoing, there is a continued need for improved object detection and classification solutions that are easily adaptable to multiple classification scenarios, including known hierarchies having two or more levels, and that provide performance or other advantages over conventional systems.

SUMMARY

In the present disclosure, novel machine learning systems and methods provide hierarchical, multiclass classification solutions that decrease the development time, increase the efficiency of the training process, and generate more accurate trained models.

In some embodiments, systems and methods include a storage device configured to store a dataset of labeled images, and a logic device configured to train a progressive precision image classifier by executing instructions. The instructions may include training a neural network to generate a classification vector comprising a plurality of confidence values, each confidence value corresponding to a classification, validating the trained neural network, calculating fine-grained confidence thresholds for each classification, wherein each classification represents a leaf-level classification in a hierarchical classification structure, and calculating coarse-level confidence thresholds for at least one parent class in the hierarchical classification structure, wherein each parent class defines a group of at least one leaf-level classification.

In various embodiments, the dataset of labeled images comprises a training dataset for use in training the neural network and a validation dataset for use in validating the trained neural network, each label identifies a leaf-level classification in the hierarchical classification structure, and the classification vector includes a 1×N vector of confidence values, where N represents a number of leaf-level classifications output by the trained neural network. The neural network may be implemented as a convolution neural network with a single output head.

In various embodiments, validating the trained neural network includes generating the classification vector for each validation input image, and storing top X confidence values, where X>=1, and a corresponding image label. Calculating the confidence thresholds for each leaf-level label may include calculating a simple average, standard deviation, and/or harmonic mean of the confidence values corresponding to valid classifications associated with each label. Calculating coarse-level confidence thresholds for at least one parent class in the hierarchical classification structure may include analyzing the top X confidence values within the hierarchy for association with a parent class and calculating the coarse-level confidence thresholds for at least one parent class using the confidence values of child classes of the parent class from the top X confidence values. The trained progressive precision image classifier may be distributed to another system for implementation as an inference model and may include calculated confidence thresholds and the classification hierarchy for use in an inference system.

The scope of the invention is defined by the claims, which are incorporated into this section by reference. A more complete understanding will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the disclosure and their advantages are best understood by referring to the detailed description that follows. It should be appreciated that like reference numerals are used to identify like elements illustrated in one or more of the figures.

DETAILED DESCRIPTION

In the present disclosure, novel machine learning systems and methods provide hierarchical, multiclass classification solutions that decrease the development time, increase the efficiency of the training process, and generate more accurate trained models.

In various embodiments, the use of statistical classification and machine learning algorithms generate fast, flexible and accurate hierarchical, multiclass classifiers for image processing systems. This disclosure further discloses a set of software tools and methods that are used to train hierarchical, multiclass neural networks to produce improved results using progressive precision logic. To develop these hierarchical, multiclass classification models, a dataset of labeled image data is collected and used to train the hierarchical, multiclass model(s) to generate one-hot vector (e.g., a 1×N matrix, where N is a number of output classifications), which is output to a post-processing logic system that further refines the progressive precision hierarchical output.

The dataset of labeled images may be split into training and validation subsets. The training dataset is used to develop one or more hierarchical, classification models, while the validation dataset will be used to evaluate the model for accuracy. In some embodiments, a variety of classification models may be evaluated, optimized and compared to determine model(s) that provide the best performance for a desired application. These methods allow the incorporation of new data, features and model parameters to iteratively tune the models and expand to further classification features.

In various embodiments, systems and methods disclosed herein provide graceful degradation of classification predictions to a pre-known hierarchy, with a high level of certainty for practical applications. Embodiments have been field tested in a realistic environment, resulting in significant outperformance of conventional solutions. Embodiments include applications where a classification hierarchy having two or more levels is known, and a fine-grained classification is desired. For example, a system may be configured to generate hierarchical classification determinations such as determining whether an object in an image is a vehicle, whether the vehicle is a truck, and whether that truck is a fire engine. The fine-grained classification (e.g., the more detailed classification) of a fire engine may be desired, but in some circumstances the classifier may lack confidence in the fine-grained classification and output one of the coarser classifications in the hierarchy (e.g., vehicle or truck) when the confidence level for the coarser classification meets or exceed certain confidence criteria (e.g., a threshold value).

In conventional systems, flat or single-head classifiers are unable to reliably recommend a hierarchy of the predicted class based on confidence. A conventional single-head classifier, for example, can include separate labels for each level of hierarchy and gather the top-x confidence predictions to determine the hierarchy, but this will be inherently biased towards the coarse levels. In another conventional approach, a multiple head classifier may be used to represent a hierarchy for classes of interest to provide outputs at each level of the hierarchy. However, since the predictions at each level are decoupled as classes of a single-head classifier, the prediction may result in an incorrect hierarchy.

In various embodiments of the present disclosure, classifications are determined with a high level of certainty for practical applications through a process of graceful degradation of predictions to a pre-known hierarchy. In one approach, a multi-label Fine Grained (FG) classifier is trained to generate one hot-vector for each input image that would define the FG classes of interest in that image. The classifier outputs are sigmoids with each activation having a value between 0 and 1 to reflect the features matched from given inputs with all known classes. This approach trains the classifier for fine grained classification and applies the hierarchy through a post-processing step. For example, if a classifier is trained to identify a vehicle type, make, model and year, but cannot identify the make/model/year with a high degree of confidence for a particular image, then the post-processing step may output a higher-level result, such as the parent class of vehicle type (e.g., pickup truck), if the confidence of the parent class is higher than a threshold. Thus, the systems and methods disclosed herein allow the classifier to learn distinguishing features between the leaves themselves, while adjusting the output to a higher hierarchical class when the classification model lacks sufficient confidence in the leaves.

Figure 1A:
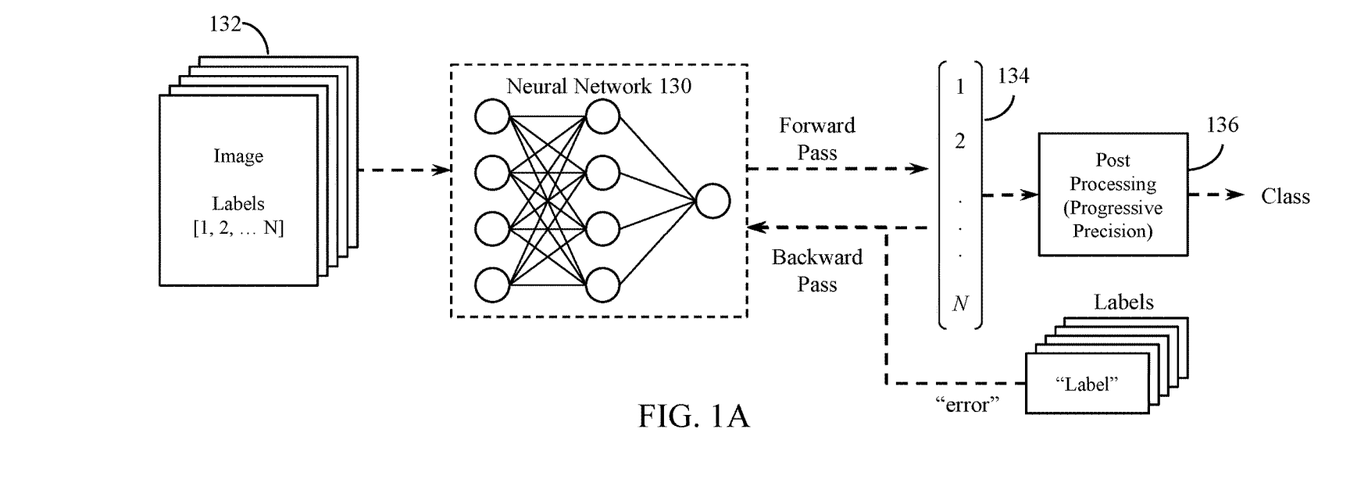
FIG. 1A illustrates an example classifier training process for progressive precision, multiclass classification, in accordance with various embodiments of the present disclosure.

Referring to FIG. 1A, a training system for a classifier with progressive precision will now be described in accordance with one or more embodiments of the present disclosure. A neural network 130 is a convolutional neural network (CNN) or other suitable classifier that receives a training dataset 132 and outputs a classification for each image. The training dataset may include a curated set of images selected to train the neural network 130 for a particular classification goal. The training dataset images may include visible light images, infrared images, or other images captured from a camera, synthetic images created by a computer system, or images generated through other approaches. For object classification, the images of the training dataset 132 may comprise a region of interest from a captured image that includes one or more objects to be identified, and labels identifying the appropriate classification for each of the objects.

In one embodiment, the training starts with a forward pass through the neural network 130 including feature extraction in a plurality of convolution layers and pooling layers, followed by image classification in a plurality of fully connected layers and an output layer. The output layer generates a vector 134 having a plurality of entries associated with a determined confidence for each of the potential classifications. In some embodiments, the vector 134 comprises sigmoid outputs with values between 0 and 1 representing the confidence of each of the N labels. The output vector 134 is next input to post-processing logic (as disclosed herein) to determine the final output of the classification, which is compared against the associated labels.

A backward pass through the neural network 130 may be used to update the network parameters in view of errors produced in the forward pass (e.g., misclassified objects as determined by a mismatch between the classification output and the associated label). In various embodiments, other neural networking topologies and training processes may be implemented consistent with the teachings of the present disclosure, provided that an output vector is generated representing confidence levels of associated labels for use by the post-processing logic.

Figure 1B:
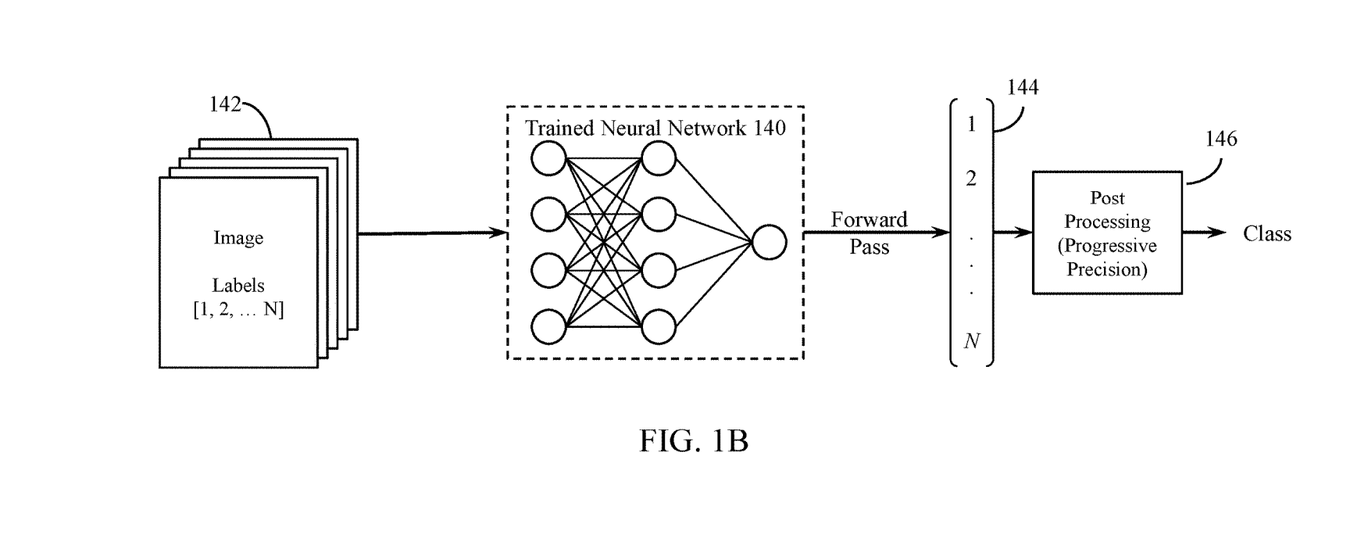
FIG. 1B illustrates an inference model validation process for the classifier of FIG. 1A, in accordance with various embodiments of the present disclosure.

An example embodiment for validating the trained neural network is illustrated in FIG. 1B. A set of fully annotated validation test images 142 is fed into the trained neural network 140 to generate classification vector 144, comprising a plurality of sigmoid values representing the confidence that the input image includes a potential class. The validation test images 142 include a variety of objects, object sizes and backgrounds to classify. In some embodiments, detected errors (e.g., image misclassification) are analyzed and fed back to a host system or to the system operator to update the training dataset 132 to improve results. Detected errors may be corrected, for example, by adding more images of particular objects (e.g., more types of vehicles) to help classify objects in an image and/or updating the post-processing logic 146. If the trained neural network 140 passes the validation step (e.g., satisfactory percentage of errors for a particular runtime scenario), the trained neural network 140 and post-processing logic 146 may then be implemented in an application (e.g., a neural network inference application) in a run time environment to classify objects detected in an image.

As previously discussed, in the illustrated embodiment the classifier's outputs are sigmoids (e.g., vector 134) and each class confidence output is mutually independent. Given a confusing sample as input (e.g., a sample which looks similar to many classes), the confidence of the classifier's outputs will not have much standard deviation between the winner and the top-x choices. In these scenarios, the failures are often within a hierarchical group. Unlike conventional systems which will return the incorrect classification (and/or no classification if the confidence is too low), the system of the illustrated embodiment will analyze one or more parent classes in the hierarchy for an appropriate output.

A high-confidence mistake is possible when the input sample has a standout feature that aligns with known class. For example, images of trucks may include a images representing a truck class and images with different loads. Different loads, though on a truck, may be classified as a truck if that is the most similar class the classifier has been trained with and the confidence will be high. For example, if the classifier is trained with the same types of different trucks representing different classes but are given a confusing sample where the load is not visible, the output confidence of these similar classes may have a very small standard deviation such that the confidences will be the same ball-park and almost all the time, the failure will be within the group. As a result, low confidence classifications at the leaf level may be grouped to generate a high confidence classification at a higher level in the hierarchy. Using this approach, the neural network 130 is trained on fine-grained labels, and the overall performance of the classifier, even for coarse labels, is improved through post-processing without a significant resource expense. In some embodiments, a loss function characterizing mis-classification errors is used for the backward pass stage of the training, based on the leaf level classification results. The neural network 130 is thus optimized for leaf level classifications, while the post-processing logic 136 is optimized for hierarchical classification.

Figure 1C:
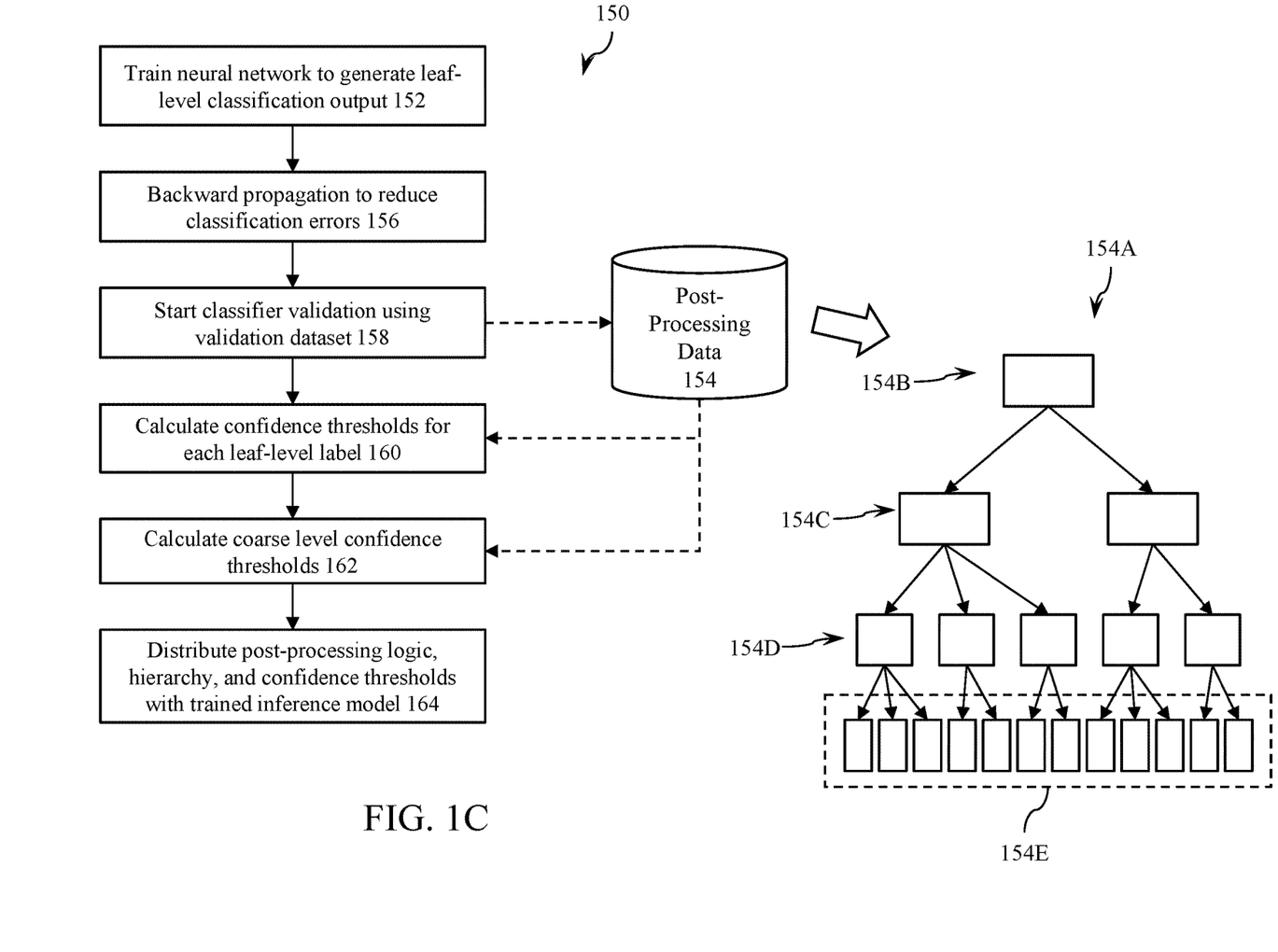
FIG. 1C is a flow diagram illustrating an example operation of the classifier training process of FIG. 1A, in accordance with various embodiments of the present disclosure.

In view of the various considerations previously discussed, one way to deduce the hierarchy of classes is to train the fine granted classifier as a flat classifier with only the leaves as classes, deduce a qualitative threshold logic for each class, and apply that externally in the system based on the classifier's own confidence across all classes observed during testing. Referring to FIG. 1C, an example process 150 will now be described in accordance with one or more embodiments. In step 152, the neural network (e.g., neural network 130) is trained to generate a classification output comprising confidence measures for a plurality of fine-grained classifications. In various embodiments, the fine-grained classifications comprise leaf-level classes in the hierarchical arrangement. The outputs are provided to a post-processing database 154 which maintains the classification results and information about the hierarchical structure. In some embodiments, the hierarchical structure 154A may include a root level 154B, one or more intermediate levels 154C & 154D, and a leaf level 154E. The leaves at the leaf level 154E may be used to define classification labels for training the neural network 130, while classifications at the intermediate (154C-D) and root levels (154B) are handled by the post-processing logic. In step 156, leaf-level classification errors are fed back to the neural network through a back propagation method to reduce classification error. In various embodiments, a cost function is selected to quantize the leaf-level mis-classification errors and the back propagation method updates the weights of the neural network to minimize the cost function.

Next in step 158, the classifier validation process starts using the validation dataset. During validation, the post-processing logic calculates confidence thresholds for each fine-grained label in step 160, and the post-processing logic calculates confidence thresholds for higher levels of the hierarchical structure, in step 162. In step 164, the system distributes post-processing logic, the hierarchy, and confidence thresholds with the trained inference model for implementation.

In one implementation of steps 160 & 162, the logic can be implemented in the system by looking at the confidence of the classifier's top-x outputs and quantitative results while under test, and calculating required thresholds for each class, each size and each level (group level threshold) and using them as decision keys in deployment, where the top confidence value of the classifier will be evaluated against the predetermined thresholds to provide the trust-confidence for each level of the trained hierarchy. In various embodiments, the thresholds are selected to achieve a desired confidence level in the results. For example, for each leaf, a lower the confidence level will usually result in more classification errors and a design goal may be to achieve 90% correct classifications. A threshold for each leaf is then set based on the output of the neural network, such that a confidence level that exceeds the threshold leads to a leaf-level classification, but a confidence level below the threshold will not lead to a leaf-level classification.

In one implementation, simple averages based quantitative thresholds are used for two levels of hierarchy in a flat fine-grained classifier, with the third (root) being the object detector class. In a test environment, this approach has performed better than conventional built-in tiered flat fine-grained classifier or multi-headed classifier approaches. In some systems, a neural network output is expected to generate the top ranked output from the classifier or apply softmax to get the top ranked output from sigmoids of the classifier. This approach assumes that the classifiers are 'well trained' (e.g., 90% accurate or above for some implementations). In one approach, the post-processing logic steps through hierarchical scenarios to make decisions, such as by considering multiple scenarios and outcomes, and logically deducing the most plausible as the top choice (e.g., by ruling out some classifications as probable based on analysis of confidence output at difference hierarchical levels).

When the external system is capable of accepting multiple outputs for each input, the top-x threshold can be used for each class the same way as the top-1 case. The output will note the most confident and second most confident classes (or, in other embodiments, extended to the top x most confident classes) and their root class. More logic can be added in the external system to correlate the groups and make further decisions, as desired. After the neural network produces the top x (for x>1) to the external system, it gives the external system more information for further actions, leading to more confident decisions. In addition, programmatic logic can be introduced to further reduce to a single confident output based on some expert system like rules-based system. As an example, if the top 2 are of similar confidence and they belong to the same root class, the system can be more confident of the root class.

In some embodiments, the thresholds and hierarchical rules are set during the validation stage. Training a classifier and validating against a dataset, provides a quantitative look at the performance. In various implementations, only the most confident output is used in the post-processing stage. The system may look at the top 2 or 3 outputs during training and inhouse testing, and performance of a well-trained classifier can often achieve 90-95% confidence for a moderately difficult use case and almost always, top x will be similar classes. To address this case, the data is provided to the post-processing logic to make an educated decision (as compared to conventional systems that take the single or most confident option). The output can then be configured to provide top 1, top 2, or top x to the end user or system, with a confidence associated to each of the tiers in a root-leaf hierarchy.

Given an input to a classifier trained for 'x' classes, the output would indicate the confidence of each of the 'x' labels known to the classifier. When the classifier is very sure, the confidence of top 1 will be higher than the rest substantially. When the classifier is not so sure, the confidence of the top x classes form a group, which is likely to consist of similar classes. Thus, in one approach, the top x classes are selected from the sigmoid output of the neural network and analyzed in the post-processing stage. If the confidence of the top result exceeds the associated leaf-level threshold and the confidence is substantially higher than other top-x results (e.g., statistically significant difference to determine classification as observed via the validation stage) then the post-processing stage may output the top result. Otherwise, processing may continue to determine whether a higher-level classification may be determined based on the top-x results. For example, determine whether the top-x leaves are children of the same higher-level classification and whether the confidence levels exceed the threshold associated with the higher-level classification.

Figure 2:
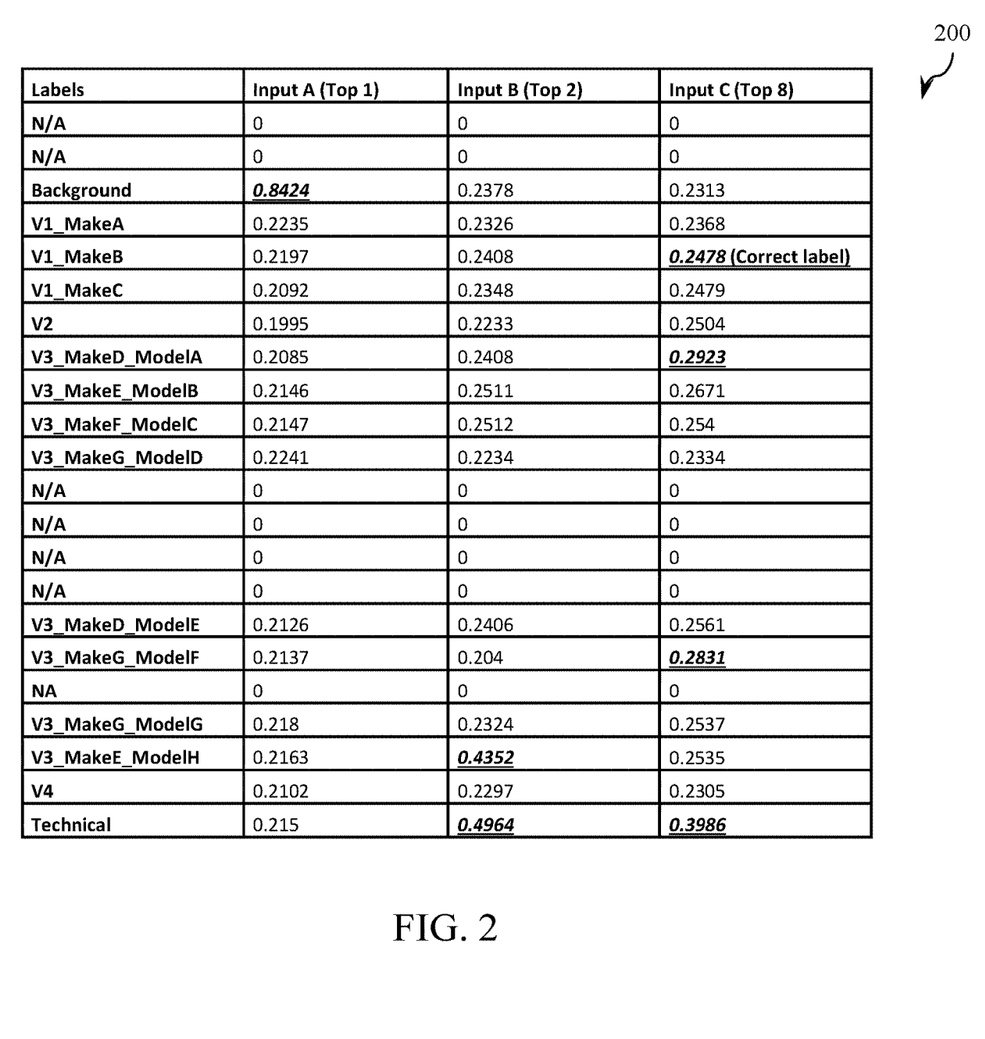
FIG. 2 illustrates example post-processing classification scenarios, in accordance with various embodiments of the present disclosure.

Referring to FIG. 2, data labels and various input scenarios to the post-processing logic will now be described with reference to the table 200. In input A, the outright winner is the classification with the highest confidence (e.g., 0.8424). In input B, none of the confidence levels are high enough to select the winner, but the top two choices (e.g., 0.4352 and 0.4964), are both pickup trucks, allowing for a confident selection of the higher-level classification on the hierarchy. Sometimes the grouping will be non-existent with the correct prediction in the top x (e.g., the grouping includes outliers). Referring to input C, the grouping for the top 3 exists, but the actual classification (e.g., a vehicle of type V1) is ranked 8th and not related to the top 3 group. In this example, the standard deviation of the confidence is much lower, and the classifier is not confident which predictions are accurate. This behavior can be observed from looking at the top-x results, where 'x' is dependent on the use-case and type of classes, e.g., similarity between classes and whether logical grouping exists as set by a stored hierarchy (e.g., which may be established using groupings perceived by humans).

Using quantitative results for a use-case with labels that can be grouped logically from testing with the validation dataset (or other holdout dataset not used in training), the system can be trained to implement the progressive precision logic external to the classifier. The selection of the method of generating the quantitative threshold may depend on the use-case and class groupings and distribution as outlined herein.

In one embodiment, a simple average is used. From a top-1 result, take the Max, Min and Average confidence of all the correct predictions for each class, at each size target. The sizes are determined based on the probability of target (POT) (e.g., small: <45×45, medium: <80×80). From a top-2 result scenario, take the Max, Min and Average confidence of all the top-2 predictions that were correct (e.g., either the $1^{st}$ or $2^{nd}$ most confident classification was correct). In this example, the system gathers the Min, Max and Average confidences of the correct label. For a top-0 result, gather the Min, Max and Average confidence of the correct class when it is an outlier (e.g., not in top-x). As used herein, this outlier scenario will be referred to as a top-0 result. Then, use the average confidence values for each class and size, from the top-1 scenario as the confidence cut-off thresholds in the external system to either accept the leaf output or progress to the root of the leaf output. The use of Average confidence thresholds is more conservative. For a more lenient threshold, the (maxConfidence+1) of the top-0 confidence may be used.

In another embodiment, the standard deviation is calculated to produce the threshold. First, the standard deviation of class Average Confidence, for each size, at top-1 is calculated. Next, calculate group's Average Confidence, for each size. Finally, define the threshold cutoff for each class as follows: ((GroupAveConf+ClassAveConf)/2)−standard deviation. In another embodiment, a harmonic mean is calculated. In this approach, the harmonic mean of the Group and Individual confidence averages is calculated: 2*(GroupAveConf*ClassAveConf)/(GroupAveConf+ClassAveConf). This approach gives a nice plateau of operating points for all classes.

The system may store post-processing data 154 (e.g., in a memory, database, etc.) including data facilitating the calculation of the percentage of failures for each class and size, based on failures in the same group (FailSameGroup) or not (FailDiffGroup). This is an indicator of how the class specific failures are grouped. This will be used as a weighted % for each class threshold against the group threshold. In this method, the threshold for each class, each size is derived as follows: Average of Group's confidence for each size*(% FailSameGroup)+Classes' Average Confidence*(% FailDiffGroup). This will give the thresholds for each class & size based on weighted average with failures in the group and outside the group. These are mostly dependent on the hold out test dataset but will give a good indication of the overall performance of the classifier.

Figure 3:
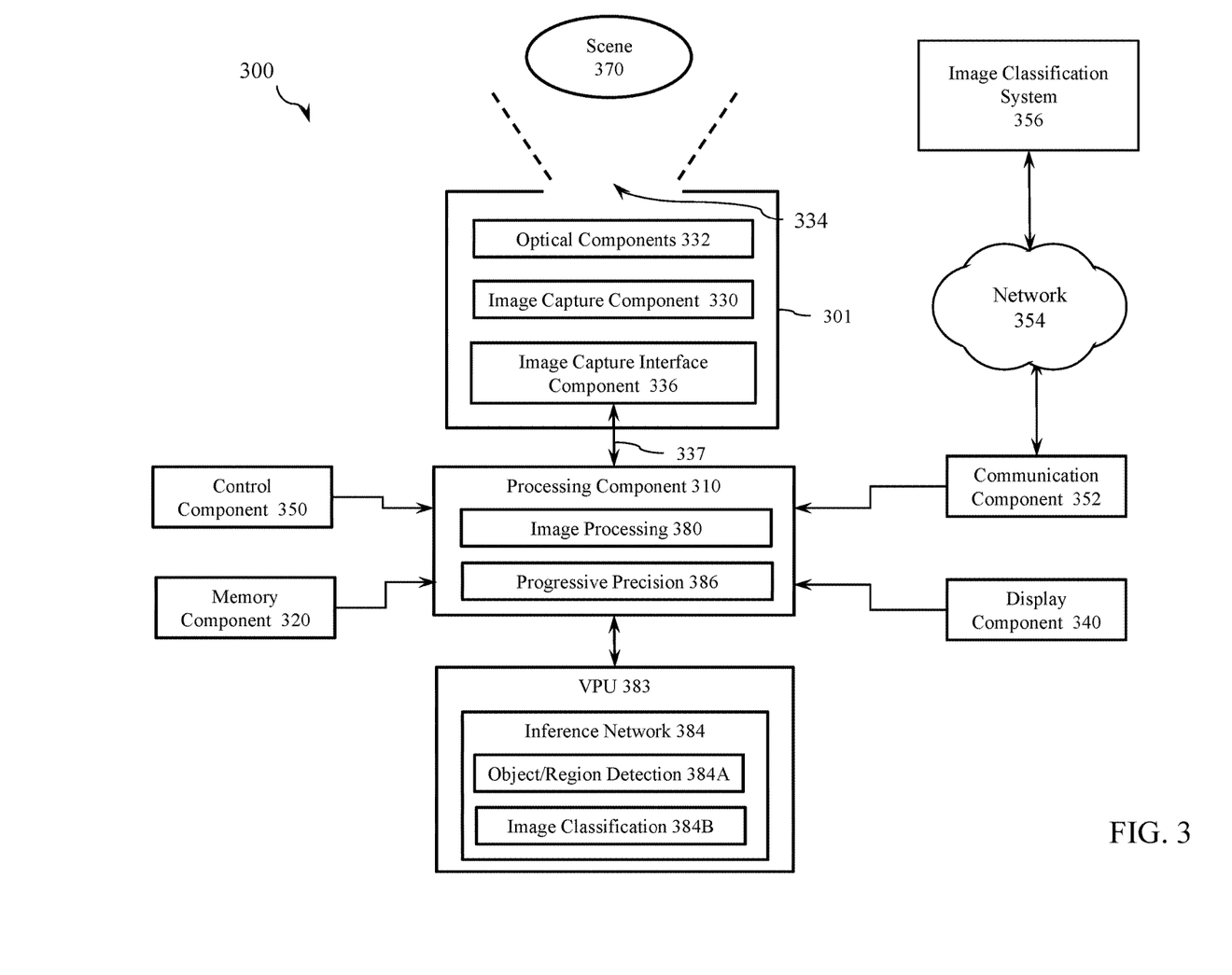
FIG. 3 illustrates an example image classification system, in accordance with various embodiments of the present disclosure.

Referring to FIG. 3, example embodiments of an imaging system 300 implementing a fine-graine, progressive precision classifier will now be described. The imaging system 300 may be an imaging system used, for example, to capture and process images to detect, classify and/or count objects that appear in a field of view. As illustrated, the imaging system 300 may be used for imaging a scene 370 in a field of view. The imaging system 300 includes a processing component 310, a memory component 320, an image capture component 330, optical components 332 (e.g., one or more lenses configured to receive electromagnetic radiation through an aperture 334 in camera component 301 and pass the electromagnetic radiation to image capture component 330), an image capture interface component 336, an optional display component 340, a control component 350, a communication component 352, and other sensing components.

In various embodiments, the imaging system 300 may be implemented as an imaging device, such as camera component 301, to capture image frames, for example, of the scene 370 in the field of view of camera component 301. In some embodiments, camera component 301 may include image capture component 330, optical components 332, and image capture interface component 336 housed in a protective enclosure. Imaging system 300 may represent any type of camera system that is adapted to image the scene 370 and provide associated image data. Imaging system 300 may be implemented with camera component 301 at various types of fixed locations and environments (e.g., highway overpass to track traffic, as part of a premises surveillance system, to monitor/track people, etc.). In some embodiments, camera component 301 may be mounted in a stationary arrangement to capture successive images of a scene 370. Imaging system 300 may include a portable device and may be implemented, for example, as a handheld device and/or coupled, in other examples, to various types of vehicles (e.g., a land-based vehicle, a watercraft, an aircraft, a spacecraft, or other vehicle).

Processing component 310 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), a graphics processing unit and/or any other appropriate combination of processing device and/or memory to execute instructions to perform any of the various operations described herein. Processing component 310 is adapted to interface and communicate with components 320, 330, 340, and 350 to perform method and processing steps as described herein. Processing component 310 is also adapted to detect and classify objects in the images captured by the image capture component 330, through image processing component 380, and a VPU 383, which implements a trained inference network 384 (e.g., neural network trained in FIGS. 1A-C), which may include an object/region detection module 384A and the trained image classifier network 384B. The processing component 310 is further adapted to implement post-processing, progressive precision logic 386 as previously described herein.

It should be appreciated that processing operations and/or instructions may be integrated in software and/or hardware as part of processing component 310, or code (e.g., software or configuration data) which may be stored in memory component 320. Embodiments of processing operations and/or instructions disclosed herein may be stored by a machine-readable medium in a non-transitory manner (e.g., a memory, a hard drive, a compact disk, a digital video disk, or a flash memory) to be executed by a computer (e.g., logic or processor-based system) to perform various methods disclosed herein. In various embodiments, the processing operations include a GenICam (Generic Interface for Cameras) interface.

Memory component 320 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 310 is adapted to execute software stored in memory component 320 and/or a machine-readable medium to perform various methods, processes, and operations in a manner as described herein.

Image capture component 330 includes, in one embodiment, one or more sensors for capturing image signals representative of a visible light image of scene 370. In one embodiment, the sensors of image capture component 330 provide for representing (e.g., converting) a captured infrared image signal of scene 370 as digital data (e.g., via an analog-to-digital converter included as part of the sensor or separate from the sensor as part of imaging system 300). Imaging sensors may include a plurality of sensors (e.g., infrared detectors) implemented in an array or other fashion on a substrate. For example, in one embodiment, infrared sensors may be implemented as a focal plane array (FPA). Infrared sensors may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. Infrared sensors may be implemented, for example, as microbolometers or other types of thermal imaging infrared sensors arranged in any desired array pattern to provide a plurality of pixels.

Processing component 310 may be adapted to receive image signals from image capture component 330, process image signals (e.g., to provide processed image data), store image signals or image data in memory component 320, and/or retrieve stored image signals from memory component 320. In various aspects, processing component 310 may be remotely positioned, and processing component 310 may be adapted to remotely receive image signals from image capture component 330 via wired or wireless communication with image capture interface component 336, as described herein.

Display component 340 may include an image display device (e.g., a liquid crystal display (LCD)) or various other types of generally known video displays or monitors. Control component 350 may include, in various embodiments, a user input and/or interface device, such as a keyboard, a control panel unit, a graphical user interface, or other user input/output. Control component 350 may be adapted to be integrated as part of display component 340 to operate as both a user input device and a display device, such as, for example, a touch screen device adapted to receive input signals from a user touching different parts of the display screen.

Processing component 310 may be adapted to communicate with image capture interface component 336 (e.g., by receiving data and information from image capture component 330). Image capture interface component 336 may be configured to receive image signals (e.g., image frames) from image capture component 330 and communicate image signals to processing component 310 directly or through one or more wired or wireless communication components (e.g., represented by connection 337) in the manner of communication component 352 further described herein. Camera component 301 and processing component 310 may be positioned proximate to or remote from each other in various embodiments.

In one embodiment, communication component 352 may be implemented as a network interface component adapted for communication with a network including other devices in the network and may include one or more wired or wireless communication components. In various embodiments, a network 354 may be implemented as a single network or a combination of multiple networks, and may include a wired or wireless network, including a wireless local area network, a wide area network, the Internet, a cloud network service, and/or other appropriate types of communication networks.

In various embodiments, imaging system 300 provides a capability, in real time, to detect, classify and/or count objects in the scene 370. For example, imaging system 300 may be configured to capture images of scene 370 using camera component 301 (e.g., a visible or infrared camera). Captured images may be received by processing component 310 and stored in memory component 320. The image processing component 380 and object/region detection module 384A may extract from each of the captured images a subset of pixel values of scene 370 corresponding to a detected object. The trained inference network 384 (e.g., a trained image classification neural network as discussed with reference to FIGS. 1A to 2) classifies the detected object and stores the result in the memory component 320, an object database or other memory storage in accordance with system preferences. In some embodiments, imaging system 300 may send images or detected objects over network 354 (e.g., the Internet or the cloud) to a server system, such as image classification system 356, for remote image classification. The object/region detection module 384A and trained inference network 384 provide analysis of the captured images to detect and classify one or more objects. In various embodiments, the inference network is a trained image classification system that may be implemented in a real-time environment. The output of the inference network 384 is provided to the progressive precision logic 386 which applies post-processing logic and thresholds to the known hierarchy to refine the classification results in the known hierarchy.

Figure 4:
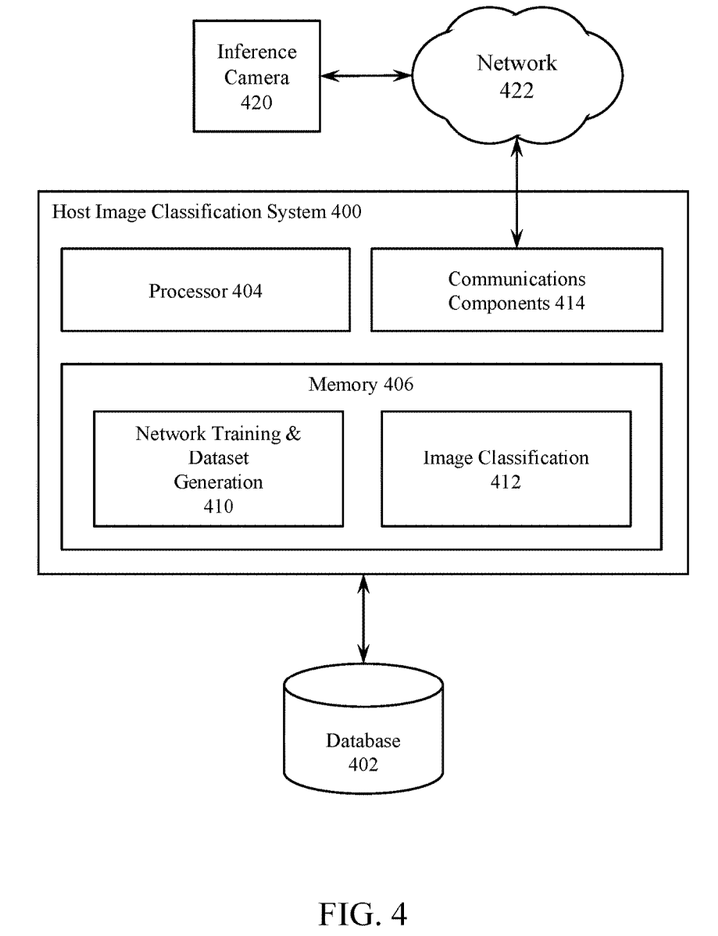
FIG. 4 illustrates an example host image classification system, in accordance with various embodiments of the present disclosure.

The imaging system 300 may be configured to operate with one or more computing devices, servers and/or one or more databases and may be combined with other components in an image classification system. Referring to FIG. 4, various embodiments of a host image classification system 400 will now be described. The host image classification system 400 may be implemented on one or more servers such as an application server that performs data processing and/or other software execution operations for generating, storing, classifying and retrieving images. In some embodiments, the components of the host image classification system 400 may be distributed across a communications network, such as communications network 422. The communications network 422 may include one or more local networks such as a wireless local area network (WLAN), wide area networks such as the Internet, and other wired or wireless communications paths suitable for facilitating communications between components as described herein. The host image classification system 400 includes communications components 414 operable to facilitate communications with one or more inference cameras 420 over the communications network 422.

In various embodiments, the host image classification system 400 may operate as a general-purpose image classification system, such as a cloud-based image classification system, or may be configured to operate in a dedicated system, such as a video surveillance system that stores video and images captured in real time from a plurality of image capture devices and identifies and classifies objects using a database 402. The host image classification system 400 may be configured to receive one or more images (e.g., an image captured from infrared camera of a video surveillance system or a visible light image) from one or more inference cameras 420 and process associated object identification/classification requests.

As illustrated, the host image classification system 400 includes one or more processors 404 that perform data processing and/or other software execution operations for the host image classification system 400. The processor 404 may include logic devices, microcontrollers, processors, application specific integrated circuits (ASICs), field programmable gate arrays (FPGAs) or other devices that may be used by the host image classification system 400 to execute appropriate instructions, such as software instructions stored in memory 406, including network training and dataset generation component 410, and image classification component 412 (e.g., a neural network trained by the training dataset), and/or other applications. The memory 406 may be implemented in one or more memory devices (e.g., memory components) that store executable instructions, data and information, including image data, video data, audio data, network information. In various embodiments, the host image classification system 400 may be configured to interface with various network devices, such as a desktop computer or network server, a mobile computing device such as a mobile phone, tablet, laptop computer or other computing device having communications circuitry (e.g., wireless communications circuitry or wired communications circuitry) for connecting with other devices in the host image classification system 400.

The communications components 414 may include circuitry for communicating with other devices using various communications protocols. In various embodiments, communications components 414 may be configured to communicate over a wired communication link (e.g., through a network router, switch, hub, or other network devices) for wired communication purposes. For example, a wired link may be implemented with a power-line cable, a coaxial cable, a fiber-optic cable, or other appropriate cables or wires that support corresponding wired network technologies. Communications components 414 may be further configured to interface with a wired network and/or device via a wired communication component such as an Ethernet interface, a power-line modem, a Digital Subscriber Line (DSL) modem, a Public Switched Telephone Network (PSTN) modem, a cable modem, and/or other appropriate components for wired communication. Proprietary wired communication protocols and interfaces may also be supported by communications components 414.

Figure 5:
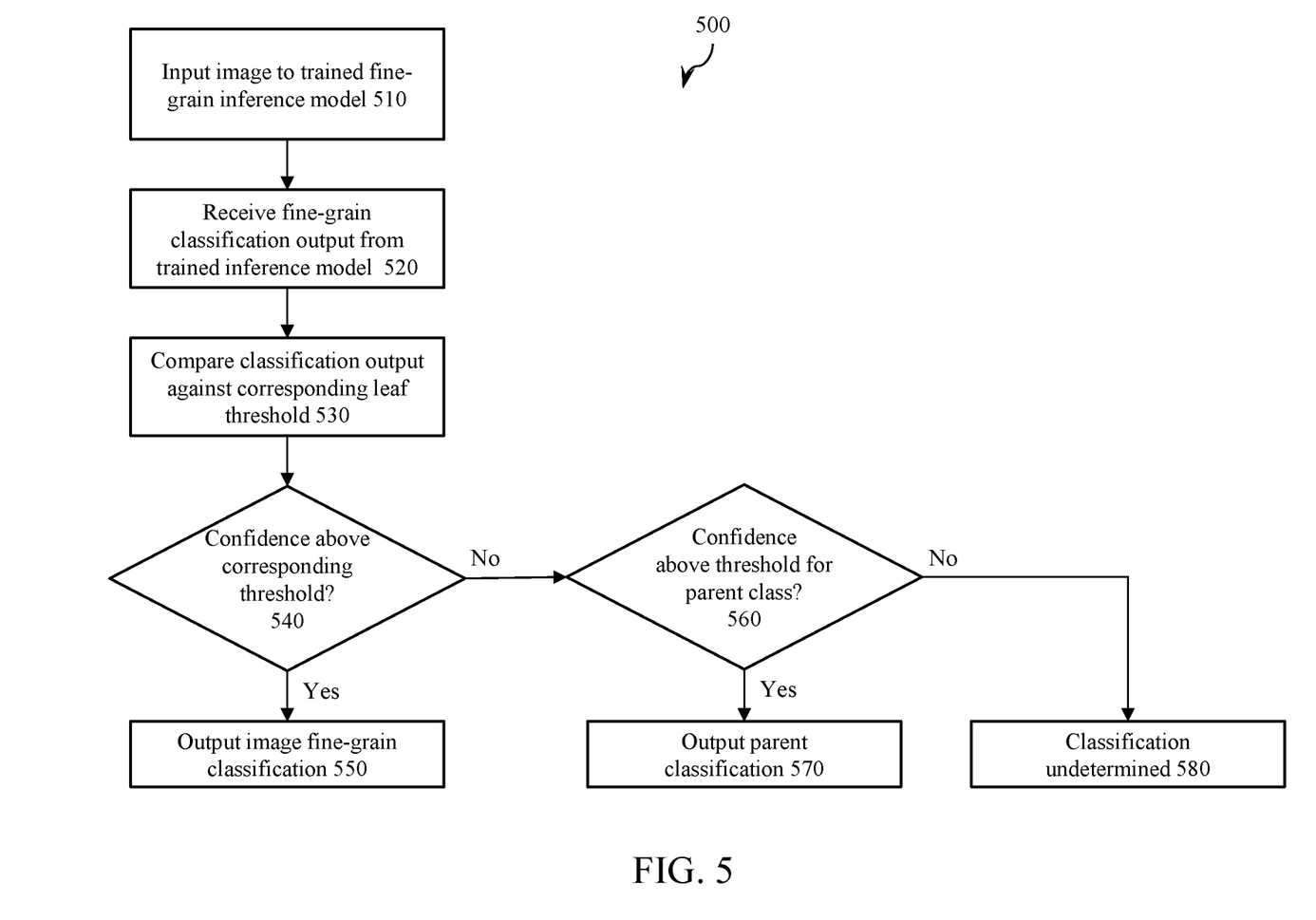
FIG. 5 is a flow diagram illustrating an example operation of the trained classifier with progressive precision post-processing, in accordance with various embodiment of the present disclosure.

FIG. 5 is a flow diagram illustrating an example process 500 for operating the trained classifier (e.g., as implemented in FIGS. 3-4) with progressive precision post-processing, in accordance with various embodiment of the present disclosure. In step 510, an image is input to the trained fine-grained inference model. As previously discussed, the inference model is trained to output leaf-level classifications along with a confidence factor. In step 520, the post-processing logic receives the fine-grain (e.g., leaf) classification output from the inference model, and the confidence is compared against the corresponding leaf threshold for the given classification, in step 530. If the confidence is above the corresponding threshold (step 540), then fine-grained image classification is confirmed and output (step 550).

If the confidence is not above the corresponding threshold, then the confidence is compared to the threshold corresponding to the parent class. If the confidence exceeds the corresponding parent threshold (step 560), then the parent classification is output in step 570. Otherwise, the classification is undetermined (step 580). Although logic for processing a two-level hierarchy is illustrated in FIG. 5, it will be appreciated that the illustrated approach may be extended to 3 or more hierarchical levels. In addition, the process 500 illustrates a classification determination (e.g., leaf classification, parent classification, insufficient confidence in determination, etc.) and other output values may be provided to the external system depending on the system configuration.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
   a storage device configured to store a dataset of labeled images; and
   a logic device configured to train a progressive precision image classifier by executing instructions comprising:
      training a neural network to generate a classification vector comprising a plurality of confidence values, each confidence value corresponding to a classification;
      validating the trained neural network;
      calculating fine-grained confidence thresholds for each classification, wherein each classification represents a leaf-level classification in a hierarchical classification structure; and
      calculating coarse-level confidence thresholds for at least one parent class in the hierarchical classification structure, wherein each parent class defines a group of at least one leaf-level classification.

2. The system of claim 1, wherein the dataset of labeled images comprise a training dataset for use in training the neural network and a validation dataset for use in validating the trained neural network.

3. The system of claim 1, wherein each label identifies a leaf-level classification in the hierarchical classification structure.

4. The system of claim 3, wherein the classification vector comprising a 1×N vector of confidence values, where N represents a number of leaf-level classifications output by the trained neural network.

5. The system of claim 1, wherein the neural network is a convolution neural network with a single output head.

6. The system of claim 1, wherein validating the trained neural network comprises generating the classification vector for each validation input image; and storing top X confidence values, where X>=1, and a corresponding image label.

7. The system of claim 6, wherein calculating the confidence thresholds for each leaf-level label comprises calculating a simple average, standard deviation, and/or harmonic mean of the confidence values corresponding to valid classifications associated with each label.

8. The system of claim 6, wherein calculating coarse-level confidence thresholds for at least one parent class in the hierarchical classification structure, comprises analyzing the top X confidence values within the hierarchy for association with a parent class, and calculating the coarse-level confidence thresholds for at least one parent class using the confidence values of child classes of the parent class from the top X confidence values.

9. The system of claim 1, further comprising distributing the trained progressive precision image classifier, including calculated confidence thresholds and the classification hierarchy for use in an inference system.

10. A method comprising:
    providing a dataset of labeled images; and
    training a progressive precision image classifier by executing instructions comprising:
       training a neural network to generate a classification vector comprising a plurality of confidence values, each confidence value corresponding to a classification;
       validating the trained neural network;
       calculating fine-grained confidence thresholds for each classification, wherein each classification represents a leaf-level classification in a hierarchical classification structure; and
       calculating coarse-level confidence thresholds for at least one parent class in the hierarchical classification structure, wherein each parent class defines a group of at least one leaf-level classification.

11. The method of claim 10, wherein the dataset of labeled images comprise a training dataset for use in training the neural network and a validation dataset for use in validating the trained neural network.

12. The method of claim 10, wherein each label identifies a leaf-level classification in the hierarchical classification structure.

13. The method of claim 12, wherein the classification vector comprising a 1×N vector of confidence values, where N represents a number of leaf-level classifications output by the trained neural network.

14. The method of claim 10, wherein the neural network is a convolution neural network with a single output head.

15. The method of claim 10, wherein validating the trained neural network comprises generating the classification vector for each validation input image; and storing top X confidence values, where X>=1, and a corresponding image label.

16. The method of claim 15, wherein calculating the confidence thresholds for each leaf-level label comprises calculating a simple average, standard deviation, and/or harmonic mean of the confidence values corresponding to valid classifications associated with each label.

17. The method of claim 15, wherein calculating coarse-level confidence thresholds for at least one parent class in the hierarchical classification structure, comprises analyzing the top X confidence values within the hierarchy for association with a parent class, and calculating the coarse-level confidence thresholds for at least one parent class using the confidence values of child classes of the parent class from the top X confidence values.

18. The method of claim 10, further comprising distributing the trained progressive precision image classifier, including calculated confidence thresholds and the classification hierarchy for use in an inference system.

19. The method of claim 10, wherein the confidence threshold for each leaf-level label is calculated by averaging a group average confidence conference and class average confidence and subtracting a standard deviation for the group.

20. The method of claim 10, wherein the classification vector comprises a plurality of sigmoid outputs.

* * * * *

UNITED STATES PATENT AND TRADEMARK OFFICE
CERTIFICATE OF CORRECTION

PATENT NO. : 12,322,168 B2  
APPLICATION NO. : 17/584330  
DATED : June 3, 2025  
INVENTOR(S) : Kedar Babu Madineni and Louis Tremblay Page 1 of 1

It is certified that error appears in the above-identified patent and that said Letters Patent is hereby corrected as shown below:

In the Claims

Claim 19, Column 15, Line 19, change "threshold" to --thresholds--.

Claim 19, Column 15, Line 20, change "confidence conference and class average" to --confidence and class average--.

Signed and Sealed this  
Fifth Day of August, 2025

Coke Morgan Stewart  
*Acting Director of the United States Patent and Trademark Office*